(12) United States Patent
Kao

(10) Patent No.: US 10,928,927 B2
(45) Date of Patent: Feb. 23, 2021

(54) VIDEO INTERACTIVE SYSTEM

(71) Applicant: ATEN International Co., Ltd., New Taipei (TW)

(72) Inventor: Kuo-Feng Kao, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 0 days.

(21) Appl. No.: 16/681,359

(22) Filed: Nov. 12, 2019

(65) Prior Publication Data

US 2020/0209982 A1 Jul. 2, 2020

(30) Foreign Application Priority Data

Dec. 28, 2018 (TW) .................................. 107147856

(51) Int. Cl.
| | | |
|---|---|---|
| *G06F 3/03* | (2006.01) | |
| *G06K 7/10* | (2006.01) | |
| *H04N 21/41* | (2011.01) | |
| *G06F 3/0346* | (2013.01) | |

(52) U.S. Cl.
CPC .......... *G06F 3/0308* (2013.01); *G06F 3/0346* (2013.01); *G06K 7/10475* (2013.01); *H04N 21/4126* (2013.01)

(58) Field of Classification Search
CPC .......... G01S 19/48; G01S 19/01; G06F 30/13; G06Q 99/00; G06T 17/05; G06T 19/006
See application file for complete search history.

(56) References Cited

U.S. PATENT DOCUMENTS

| | | | |
|---|---|---|---|
| 2007/0001904 A1 | 1/2007 | Mendelson | |
| 2008/0169132 A1 | 7/2008 | Ding et al. | |
| 2015/0015482 A1 | 1/2015 | Njolstad et al. | |
| 2016/0139690 A1* | 5/2016 | Chang | G06F 3/0346 345/179 |
| 2016/0334884 A1* | 11/2016 | Solomon | G06F 3/0386 |
| 2020/0104433 A1* | 4/2020 | Santarone | G06T 19/006 |

FOREIGN PATENT DOCUMENTS

| | | |
|---|---|---|
| TW | 101578568 A | 11/2009 |
| TW | 2018/37660 A | 10/2018 |

OTHER PUBLICATIONS

Taiwanese Office Action, dated Aug. 16, 2019, in a counterpart Taiwanese patent application, No. TW 107147856.

* cited by examiner

*Primary Examiner* — Nelson M Rosario
(74) *Attorney, Agent, or Firm* — Chen Yoshimura LLP

(57) ABSTRACT

A video interactive system includes at least one input device, a plurality of wireless positioning devices, at least one interactive device, and an image processing device. The input device provides image data. Each wireless positioning device is disposed in an operation space and transmits a positioning signal. The interactive device is paired with the input device and has a plurality of sensors for receiving the positioning signals. The interactive device is movably disposed in the operation space and generates action information corresponding to a display device. The image processing device is electrically connected to the input device and the display device. The image processing device receives the image data from the input device and outputs the image data to the display device based on the action information.

12 Claims, 14 Drawing Sheets

VIDEO INTERACTIVE SYSTEM

BACKGROUND OF THE INVENTION

Field of the Invention

This invention relates to a video interactive system, and in particular, it relates to a video interactive system for display devices.

Description of Related Art

Technological developments change people's lifestyle. For example, presenters at meetings now use notebook computers to project images on screens, rather than using overhead projectors with transparencies, and participants of meetings use electronic devices in lieu of paper for discussion. In a meeting situation where multiple electronic devices (such as computers) are used, a central control computer may be used to switch among the multiple electronic devices, so that images provided by the multiple electronic devices can be selectively projected on the screen to facilitate discussions among meeting participants. However, this method requires one of the multiple computers to be used as the central control computer, and an operator is required to perform the switching. When the presenter and the operator of the central control computer are not the same person, communication between them may not be smooth. Thus, the system for using multiple electronic devices in meetings still needs improvements.

SUMMARY

An object of the present invention is to provide a video interactive system which can improve the smooth operation of video interaction.

To achieve the above objects, the present invention provides a video interactive system which includes at least one input device, a plurality of wireless positioning devices, at least one interactive device, and an image processing device. The input device provides image data. Each wireless positioning device is disposed in an operation space and transmits a positioning signal. The interactive device is paired with the input device, and has a plurality of sensors configured to receive the positioning signals. The interactive device is movably disposed in the operation space and generates action information corresponding to a display device. The image processing device is electrically connected to the input device and the display device. The image processing device receives the image data from the input device and outputs the image data to the display device based on the action information from the interactive device.

In another aspect, the present invention provides a video interactive system which includes at least one interactive device and an image processing device. The video interactive system is operated in an operation space, where at least one display device, a plurality of wireless positioning devices, and at least one input device are provided in the operation space. The display device is installed on a first mounting surface. Each wireless positioning device is disposed in an operation space and transmits a positioning signal. The input device provides image data. The interactive device is paired with the input device, and has a plurality of sensors configured to receive the positioning signals. The interactive device is movably disposed in the operation space and generates action information corresponding to the display device. The image processing device is electrically connected to the input device and the display device. The image processing device receives the image data from the input device and outputs the image data to the display device based on the action information from the interactive device.

DETAILED DESCRIPTION OF PREFERRED EMBODIMENTS

Figure 1:
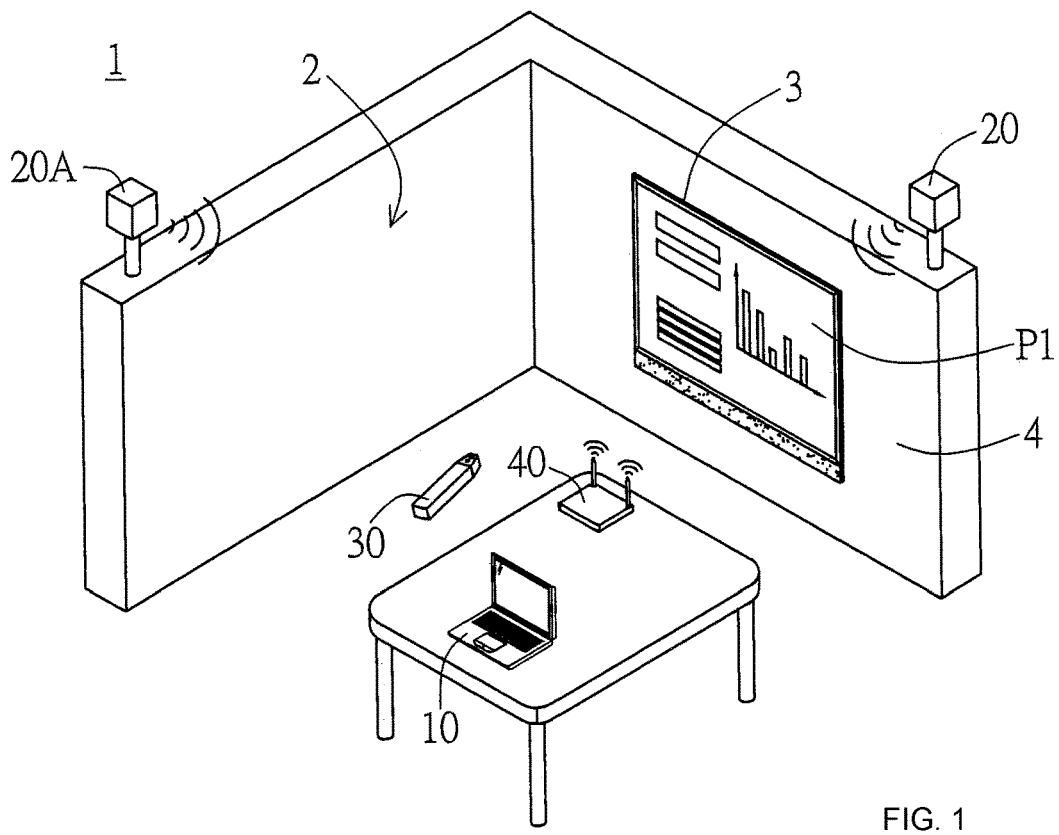
FIG. 1 schematically illustrates a video interactive system according to an embodiment of the present invention.

FIG. 1 schematically illustrates a video interactive system 1 according to an embodiment of the present invention. As shown in FIG. 1, the video interactive system 1 includes an input device 10, wireless positioning devices 20 and 20A, an interactive device 30, and an image processing device 40. The video interactive system 1 operates in an operation space 2. In the example of FIG. 1, the operation space 2 includes a display device 3 installed on a mounting surface 4. The wireless positioning devices 20 and 20A are disposed in the operation space 2, and transmit positioning signals. The image processing device 40, which may be implemented by electrical circuitry including logic circuits and/or processors with associated computer readable non-volatile memories where the processors execute computer executable program code stored in the memories, is electrically connected to the input device 10 and the display device 3. In this embodiment, the input device 10 may be, for example, a smartphone or a notebook computer, which generates image data and outputs the image data via the image processing device 40 to the display device 3. The operation space 2 is a three-dimensional space and may be, for example, a conference room, and the mounting surface 4 may be a wall or furniture of the conference room. The conference room has multiple walls that define the boundary of the operation space 2. The image processing device 40 is operable to calculate operation space information (e.g., a spatial coordinate system including x, y, z axes) based on the boundary and the positioning signals. However, the invention is not limited to this; alternatively, the wireless positioning devices 20 and 20A are operable to calculate the operation space information based on the boundary and provide the position information to the image processing device 40 (which requires the image processing device 40 and the wireless positioning devices 20 and 20A to be electrically connected to each other). The interactive device 30 is paired with the input device 10. The interactive device 30 receives the positioning signal via sensors located on the interactive device 30 (not shown in this drawing). The image processing device 40 determines the three-dimensional position (e.g., position expressed in the (x, y, z) coordinate system) of the interactive device 30 in the operation space 2 based on the operation space information and the positioning signals. The interactive device 30 is movably disposed in the operation space 2 and generates action information corresponding to the display device 3.

More specifically, the interactive device 30 obtains action information based on the positioning signals. Action information refers to the posture and/or movement trajectory of the interactive device 30 within the operation space 2. In the example shown in FIG. 1, the interactive device 30 is postured in the operation space 2 with its pointing end pointing to the display device 3. The image processing device 40 receives the action information, and output the image data to the display device 3 based on the action information. In other words, the image processing device 40 determines the posture of the interactive device 30 based on the action information, and outputs the image data to the corresponding display device based on the posture of the interactive device 30. In the example shown in FIG. 1, the image data generated by the input device 10 is output to the display device 3, so that the display device 3 displays image P1. This way, the image data can be output to the designated display device without using a central control computer.

Figure 2:
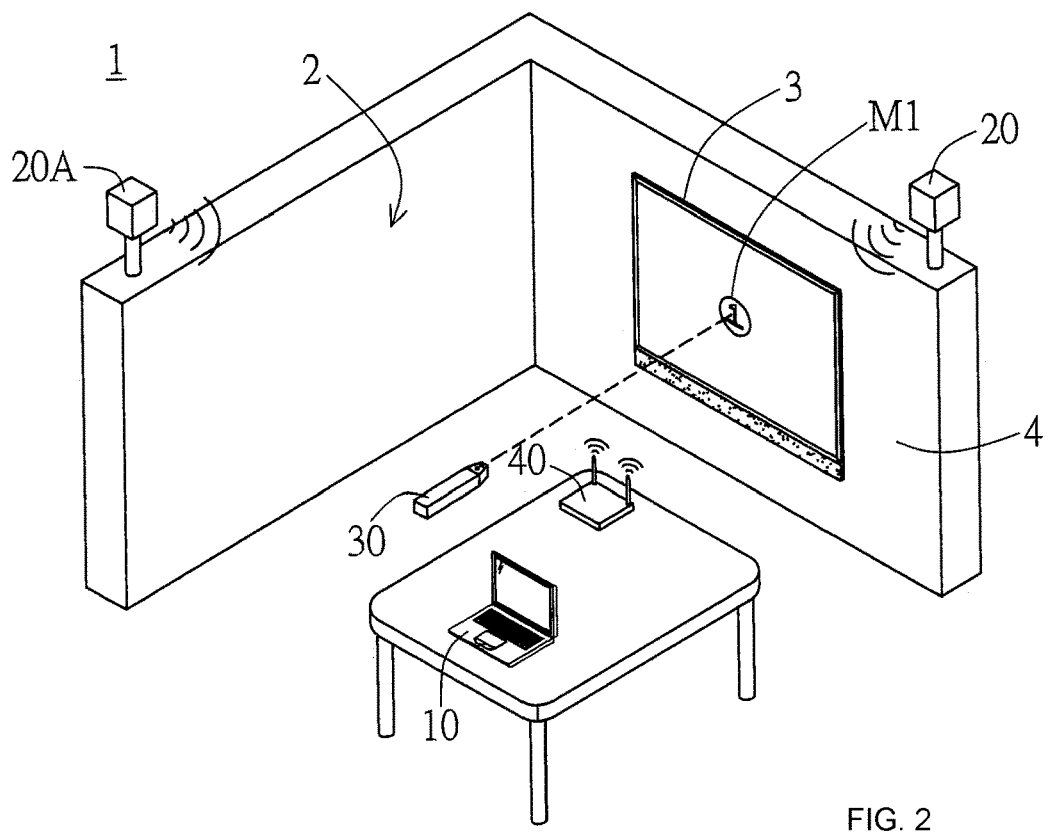
FIG. 2 schematically illustrates the video interactive system during a setting operation according to an embodiment of the present invention.

FIG. 2 schematically illustrates an example of the video interactive system 1 outputting image data. In this example, a setting operation of the image processing device 40 and the display device 3 is carried out before outputting the image data of the input device 10. During the setting operation, the image processing device 40 outputs mark information to the display device 3, so that a mark M1 is displayed on the display device 3 as shown in FIG. 2. The interactive device 30 is pointed to the display device 3 in response to the mark information; i.e., when the display device 3 displays the mark M1, the user points the interactive device 30 to the display device 3 that displays the mark M1. By this operation, the interactive device 30 outputs initial action information to the image processing device 40. Similar to the above-mentioned action information, initial action information refers to the posture and/or movement trajectory of the interactive device 30 within the operation space 2. As shown in FIG. 2, the interactive device 30 is postured in the operation space 2 with its pointing end pointing to the display device 3. The image processing device 40 receives and stores the initial action information, and records the display device 3 that corresponds to the initial action information (i.e. the image processing device 40 correlates the initial action information with the display device 3 that is displaying the mark M1). Thus, after the setting operation, the image processing device 40 is able to output image data to a designated display device 3 at any given time by comparing the action information at that time with the stored initial action information. The setting operation can reduce the calculation burden on the image processing device 40, and improve accuracy of the output.

Those skilled in the art will appreciate that the display device 3, at the time of system setup, typically communicates its device information (such as Extended Display Identification Data, EDID) to the image processing device 40 or the input device 10. The device information may include information about the physical size of the displayed area of the display device, which may be used by the image processing device 40 to more accurately determine whether the interactive device 30 is pointed to the display device 3 even when the interactive device 30 is not exactly pointed to the mark M1.

Figure 3:
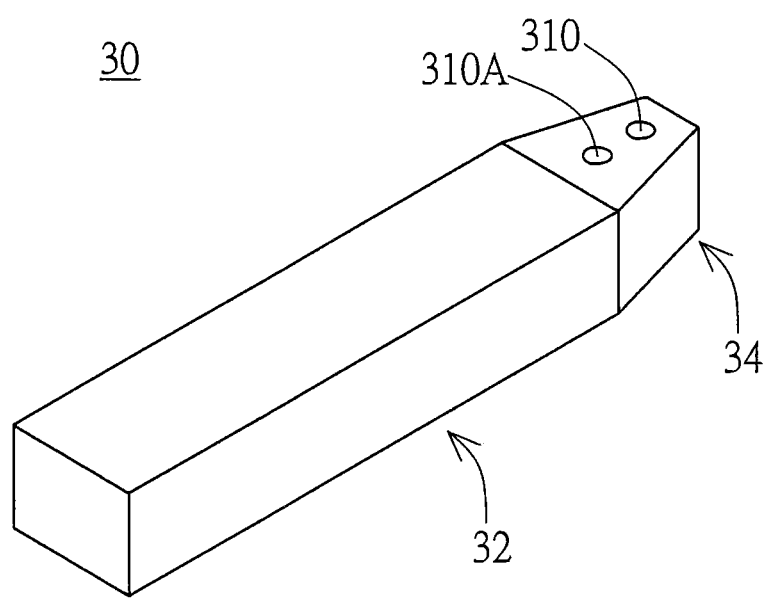
FIG. 3 schematically illustrates an interactive device according to an embodiment of the present invention.

FIG. 3 schematically illustrates an interactive device 30 according to an embodiment of the present invention. As described earlier, the interactive device 30 is configured to receive the positioning signals using its sensors. As shown in FIG. 3, the interactive device 30 has sensors 310 and 310A which receives the positioning signals. The interactive device 30 has an operation section 32 and a sensing section 34. The operation section 32 allows the user to hold the interactive device 30, and the sensing section 34 is where the sensors 310 and 310A are located. For example, the operation section 32 may have an elongated shape suitable to be help by a user's hand, and the sensing section 34 is located at one end of the operation section 32.

Figure 4A:
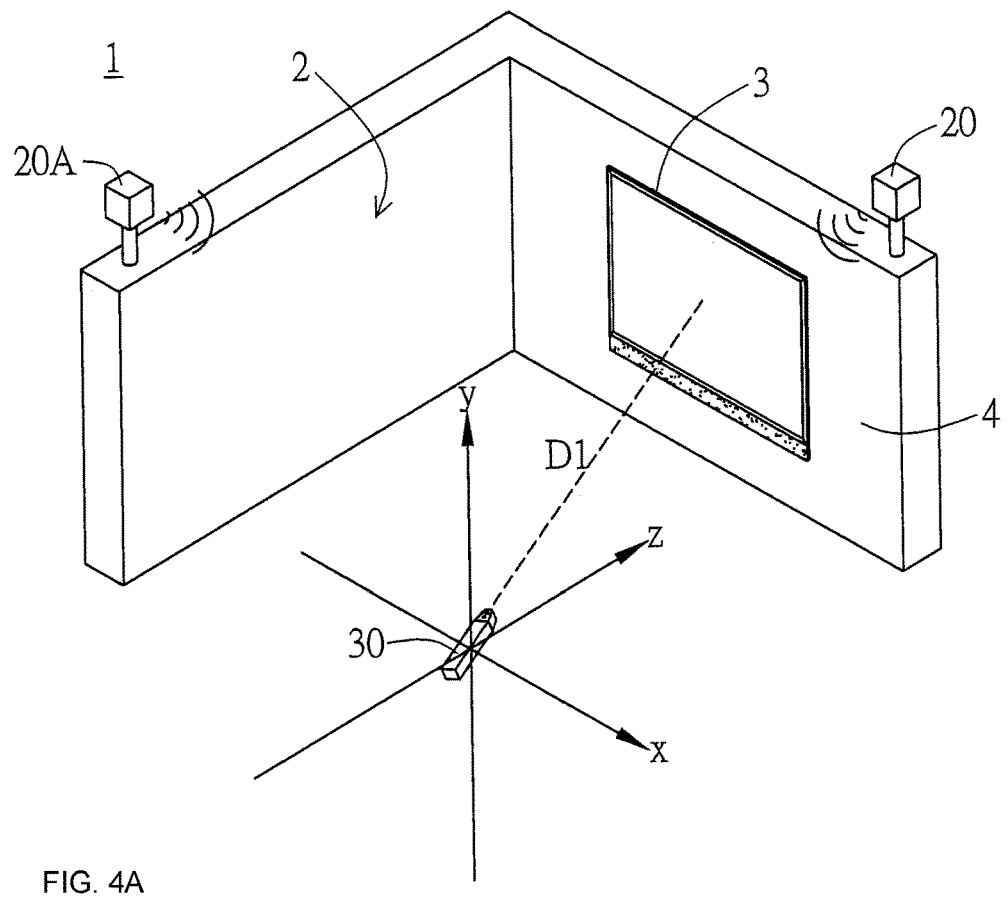
FIG. 4A schematically illustrates the interactive device generating action information.

FIG. 4A schematically illustrates the interactive device generating action information. To more conveniently illustrate the relationship between the interactive device 30 and the wireless positioning devices 20 and 20A, this drawing omits the input device and image processing device. As shown in FIG. 4A, the wireless positioning devices 20 and 20A are disposed in the operation space 2, and transmits positioning signals. For example, each of the wireless positioning devices 20 and 20A may be a laser transmitter which generates a laser beam that scans the operation space 2 with predetermined timing. In one example, the laser beam forms a plane that is swept in a particular direction, for example, a plane passing through the positioning device and extending in a substantially horizontal direction and is scanned in the vertical direction. Preferably, the position of each laser transmitter in the (x, y, z) coordinate system, the angular speed of the laser beam scanning, and the starting angle and time of each scan are known. The different laser transmitters may use different laser light wavelengths. Each of the multiple sensors 310, 310A on the interactive device 30 receives the laser signals from each of the laser transmitters, and the timing of receipt of the laser signal from each laser transmitter by each sensor is obtained. Based on the timing information of the received laser signals and the above-mentioned known information, the positions of the multiple sensors can be calculated. In an exemplary algorithm, with the above-mentioned known information, and based on the timing of when the sensor 310 received the laser signal of the wireless positioning device 20, the interactive device 30 can calculate the angle of the line between the sensor 310 and the wireless positioning device 20 at that time point. The same calculation can be carried out for each of the sensors 310 and 310A with respect to each of the wireless positioning devices 20 and 20A. Then, the positions of the sensors 310 and 310A in the (x, y, z) coordinate system can be calculated using triangulation. Further, because the positions of the sensors 310, 310A with respect to the overall interactive device 30 are known, the position and the pointing angle of the interactive device 30 can be determine. This way, the interactive device 30 can determine its action information, including the position and pointing angle. The image processing device 40 can therefore determine, based on the action information, where the interactive device 30 is pointed to. In the example shown in FIG. 4A, the image processing device 40 determines that the interactive device 30 is pointing along the direction D1 to the display device 3 on the mounting surface 4. In this embodiment, the interactive device 30 calculates a projected location on the mounting surface 4 based on the (x, y, z) position and the pointing angle of the interactive device 30 (the location of the mounting surface 4 is known), and based on this projected location, the image processing device 40 enables the user to use the interactive device 30 to perform corresponding operations on the display device 3 as described in more detail later. Alternatively, the above calculations required to determine the projected location of the interactive device 30 on the mounting surface 4 can be performed by the image processing device 40 based on the position and pointing angle of the interactive device 30. More generally, various technologies using wireless positioning devices and sensors to determine the position of the sensors in a given space are known, and can be adopted for this embodiment.

Figure 4B:
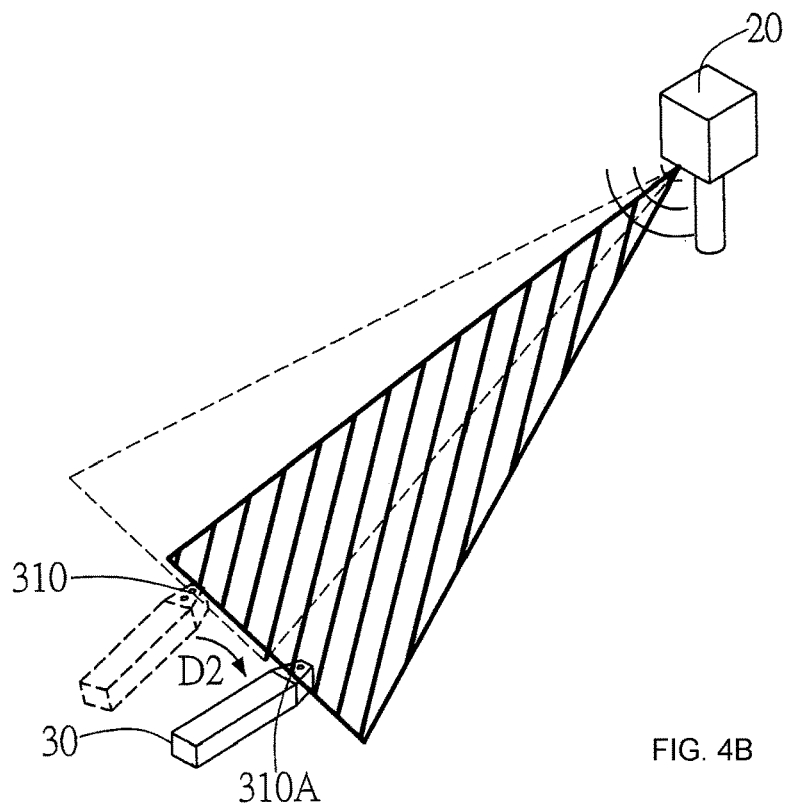
FIG. 4B schematically illustrates the interactive device receiving positioning signals.

FIG. 4B schematically illustrates the interactive device receiving positioning signals. As shown in FIG. 4B, the wireless positioning device 20 scans the space using a plane of light schematically illustrated as the solid line triangle and the dashed line triangle, and the interactive device 30 receives the positioning signals (the light). In this example, the user holds the interactive device 30 and swings it to the right as depicted by the direction D2. FIG. 4B depicts the interactive device 30 located at an initial position (as indicated by the interactive device depicted by dashed lines), and the sensor 310 receiving a positioning signal (as depicted by the dashed line triangle); it also depicts the interactive device 30 located at a current position (as indicated by the interactive device depicted by solid lines), and the sensor 310A receiving a positioning signal (as depicted by the solid line triangle). As described earlier, different ones of the multiple sensors on the interactive device 30 receive positioning signals at different times depending on the location of the interactive device, and the timing information is used to determine the position of the sensors and thus the interactive device. In this embodiment, the image processing device 40 can determine the movement trajectory of the interactive device 30 along the direction D2 based on the action information provided by the interactive device 30 at the two different times. It should be understood that this example is only schematic; the image processing device 40 preferably uses the signals from multiple wireless positioning devices (as shown in FIG. 4A) to more accurately calculate the movement trajectory.

Figure 5A:
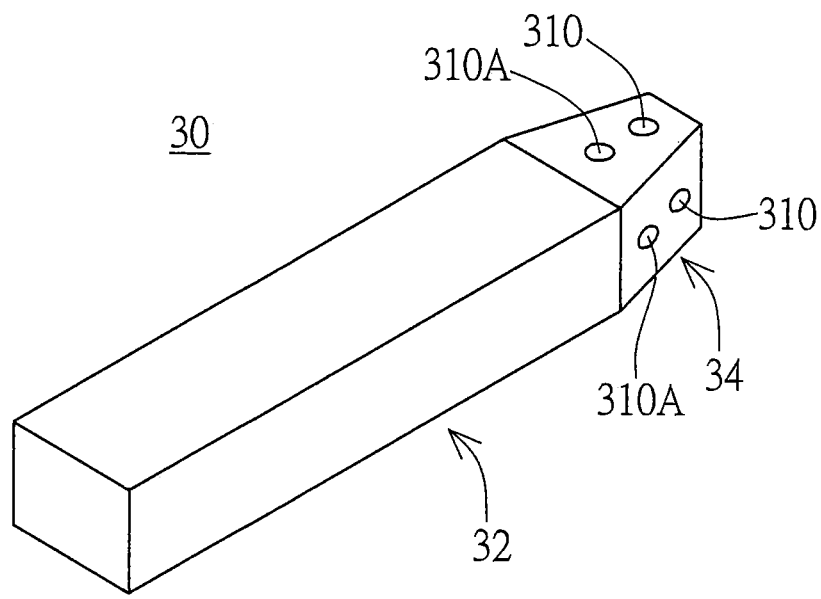
FIGS. 5A and 5B schematically illustrate an interactive device according to another embodiment of the present invention.
Figure 5B:
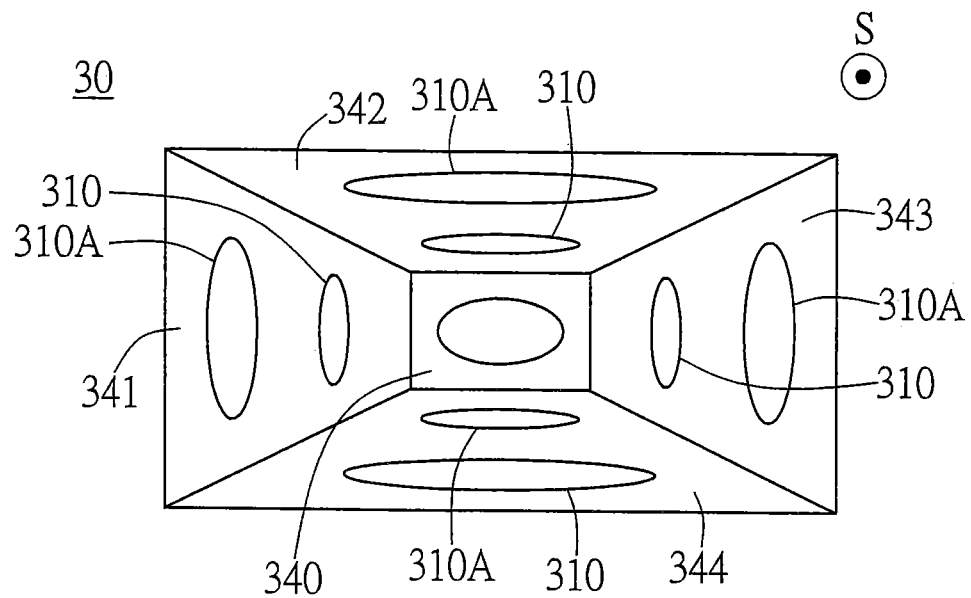

FIGS. 5A and 5B schematically illustrate the interactive device 30 according to another embodiment of the present invention. As shown in FIG. 5A, the interactive device 30 in this embodiment has an operation section 32 and a sensing section 34. The sensing section 34 has multiple sensors located on multiple facets. FIG. 5B illustrates a view toward a front facet 340 of the sensing section 34. As shown in FIG. 5B, the interactive device 30 has a pointing direction S (i.e. its longitudinal direction), and the front facet 340 of the sensing section 34 is perpendicular to the pointing direction S. The interactive device 30 also has multiple connecting facets (341, 342, 343, and 344). Each connecting facet is joined to the front facet 340 at one end and joined to the operation section 32 at the opposite end (i.e. the end opposite to the end that is joined to the front facet 340) (see FIG. 5A). Each of the front facet 340 and the connecting facets has at least one sensor (310, 310A). In the example of FIGS. 5A and 5B, each of the connecting facets (341, 342, 343, and 344) has two sensors, and the front facet 340 has one sensor. Providing sensors on the multiple connecting facets enables the interactive device 30 to obtain more accurate action information. As illustrated in FIGS. 5A and 5B, the connecting facets (341, 342, 343, and 344) may be non-perpendicular to the front facet 340. The non-perpendicular relationship between the connecting facets and the front facet can increase the sensitivity of the laser signal reception by the sensors, because the sensors can still adequately receive the laser signals from the positioning device even when the user rotates the interactive device.

Figure 6:
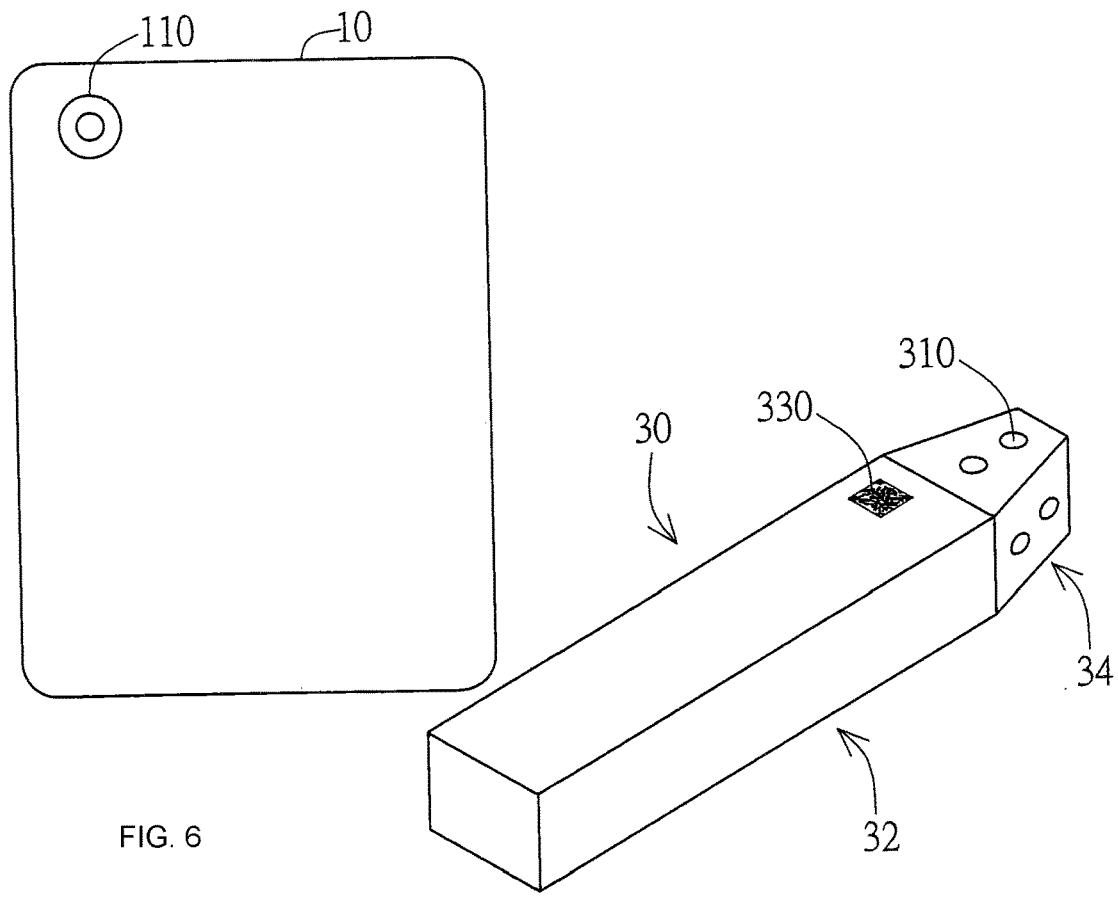
FIG. 6 schematically illustrates a paring operation to pair the interactive device with an input device.

FIG. 6 schematically illustrates a paring operation of the interactive device 30 and the input device 10. In the embodiment of FIG. 6, the interactive device 30 is paired with the input device 10 using a recognition mark 330 carried on the exterior of the interactive device 30. As shown in FIG. 6, the interactive device 30 has a recognition mark 330, and the input device 10 has a camera 110. The recognition mark 330 may be, for example, a 2d barcode or other machine readable code. The camera 110 may be, for example, a rear facing camera of a smartphone. The recognition mark 330 is used to pair the interactive device 30 with the input device 10, so that the image processing device 40 can generate output images for the input device 10 based on the action information of the paired interactive device 30. In one embodiment, the input device 10 uses its camera 110 to read the recognition mark 330 in order to pair itself with the interactive device 30, to generate pairing information. Based on the pairing information received from the input device 10 and the action information generated by the paired interactive device 30, the image processing device 40 assigns an output channel to the input device 10, to output the image data generated by the input device 10 to the display device that corresponds to the action information. In other words, by pairing the interactive device 30 with a specific input device 10, the image processing device 40 can know the paring relationship of the input device 10 that pairs and the interactive device 30 based on the pairing information. Thus, when the image processing device 40 determines the posture of the interactive device 30, the image processing device 40 can output the image data generated by the paired input device 10 to the corresponding display device 3.

Figure 7:
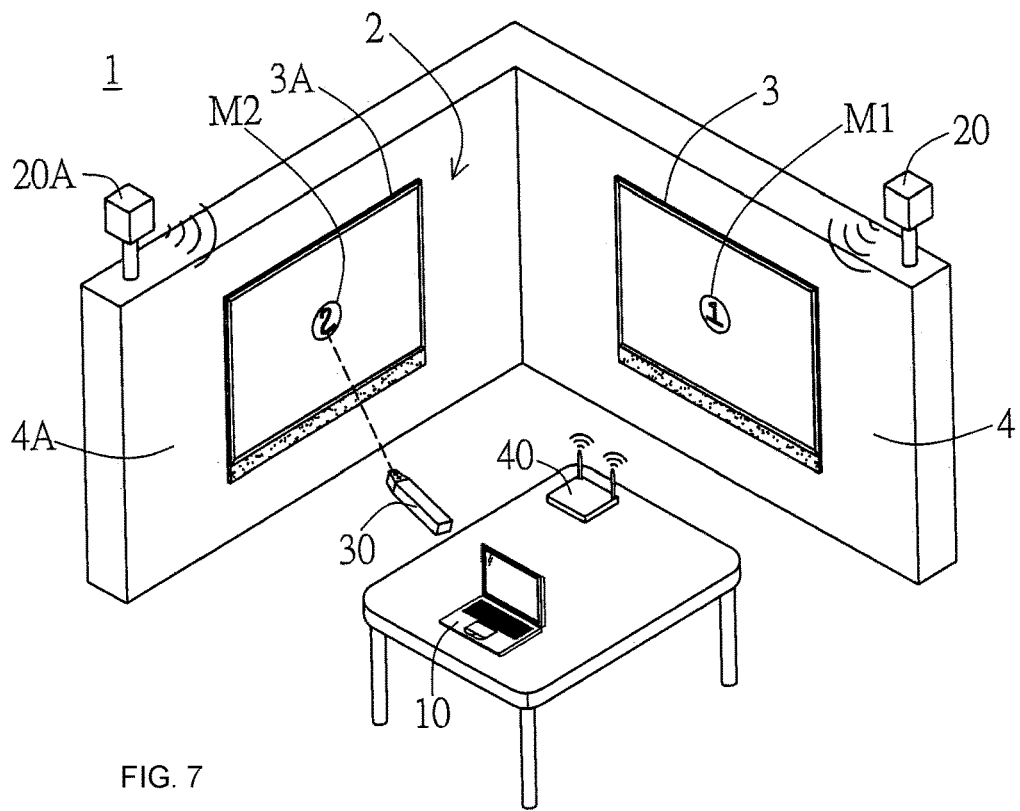
FIG. 7 schematically illustrates the video interactive system during a setting operation according to another embodiment of the present invention.

FIG. 7 schematically illustrates the video interactive system in a setting operation in another embodiment. FIG. 7 illustrates the setting of multiple input devices. As shown in FIG. 7, the operation space 2 has a mounting surface 4 and another, different mounting surface 4A. The mounting surface 4 has a display device 3 installed thereon, and the mounting surface 4A has a display device 3A installed thereon. During the setting operation, the image processing device 40 sequentially transmits respective mark information to the multiple display devices 3 and 3A. As shown in FIG. 7, a mark M1 is displayed on the display device 3 based on the mark information. Based on the mark information, the interactive device 30 points to the display device 3; i.e., when the display device 3 displays the mark M1, the user points the interactive device 30 to the display device 3 that displays the mark M1. This way, the interactive device 30 transmits the initial action information (corresponding to display device 3) to the image processing device 40. Then, a mark M2 is displayed on the display device 3A. Based on this displayed mark, the use points the interactive device 30 to the display device 3A. As shown in FIG. 7, the interactive device 30 is postured in the operation space 2 with its pointing end pointing to the display device 3A. The image processing device 40 receives the initial action information (corresponding to display device 3A) from the interactive device 30. Based on the two pieces of initial action information, the image processing device 40 records the corresponding display devices. Thus, after the setting is complete, the image processing device 40 can compare the action information at any given time with the initial action information to determine whether to output the image data to the display device 3 or the display device 3A.

The setting of the multiple display devices is preferably accomplished using a single interactive device 30. The image processing device 40 records the corresponding display devices based on the postures of the interactive device 30 at the time of the setting operation. When other interactive devices 30 are to the system added later, that record of the display devices can be used for operations of the other interactive devices, and there is no need to re-do the setting operation.

Figure 8:
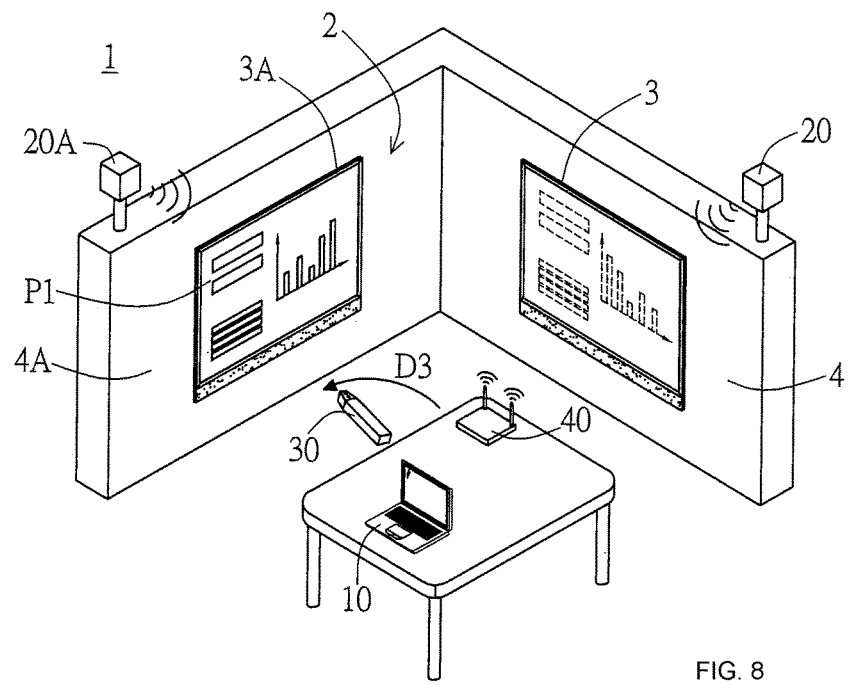
FIG. 8 schematically illustrates a dragging operation using the interactive device to drag images between multiple display devices.

FIG. 8 schematically illustrates a dragging operation using the interactive device 30 to drag images between multiple display devices. As shown in FIG. 8, the mounting surface 4 of the operation space 2 has a display device 3 installed thereon, and the mounting surface 4A has a display device 3A installed thereon. The interactive device 30 is paired with the input device 10. As shown in FIG. 8, when the user swings the interactive device 30 to the left as depicted by the direction D3, whereby the interactive device 30 changes from previously pointing to the display device 3 to now pointing to the display device 3A, the image processing device 40 switches the output channel based on the action information received from the interactive device 30, so as to change the destination of output the image data from previously outputting to display device 3 to now outputting to display device 3A. As shown in FIG. 8, the display device 3 initially displays an image (as depicted by the dashed lines); after the image processing device 40 changes the output channel based on the change in posture of the interactive device 30, the display device 3A now displays the image P1. This accomplishes the dragging of the image between display devices. In other embodiments, the above operation may be combined with another user interface feature of the interactive device 30. For example, the operation section 32 of the interactive device 30 may additionally be provided with push buttons; and dragging may be accomplished when the user presses a button while swinging the interactive device 30 in a certain direction.

Figure 9:
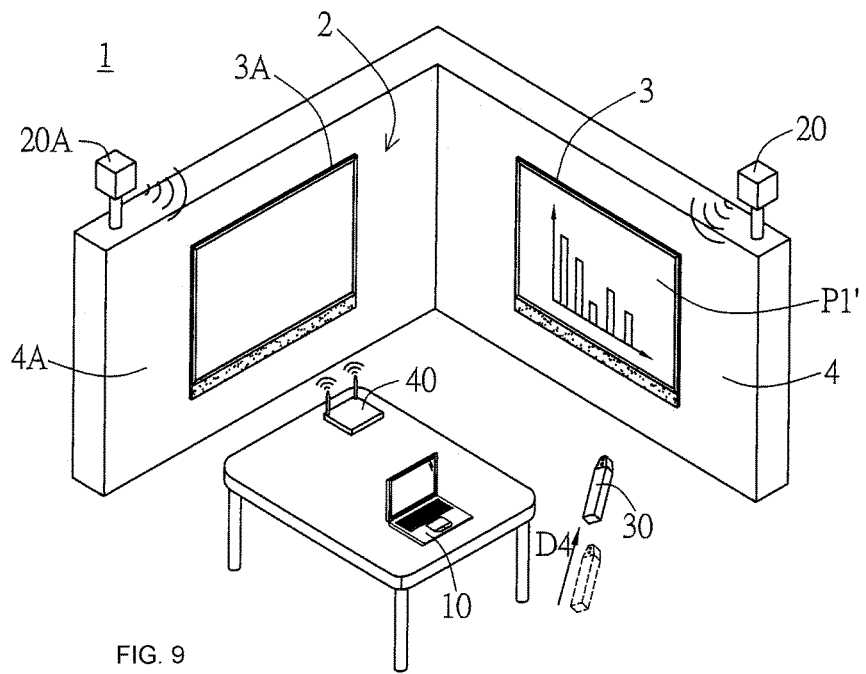
FIG. 9 schematically illustrates an image scaling operation using the interactive device.

FIG. 9 schematically illustrates an image scaling operation using the interactive device 30. As shown in FIG. 9, when the interactive device 30 moves toward the display device 3, as depicted by the direction D4, to a position closer to the display device 3, the image processing device 40 enlarges the image displayed on the display device 3 based on such action information. Referring to FIGS. 1 and 9, the initial image P1 (see FIG. 1) has an overall size that fits the size of the display device 3. Based on the change of posture of the interactive device 30 described above, the image processing device 40 enlarges the image P1 to an image P1', thereby accomplishing the scaling of the image. In other embodiments, the above operation may be combined with buttons on the interactive device 30. For example, scaling may be accomplished when the use presses a button while moving the interactive device 30 along a linear direction closer to or farther away from the display device 3.

Figure 10:
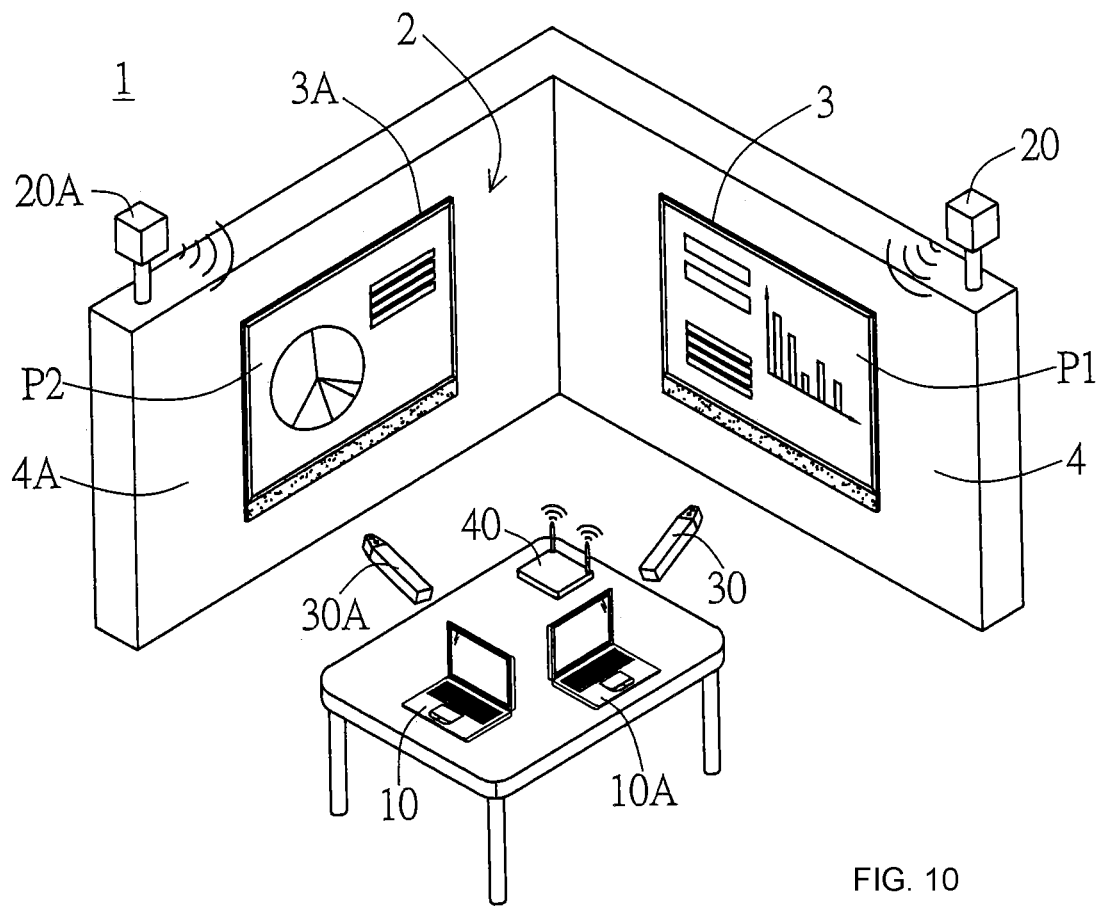
FIG. 10 schematically illustrates a video interactive system using multiple interactive devices and multiple display devices according to an embodiment of the present invention.

FIG. 10 schematically illustrates a video interactive system using multiple interactive devices and multiple display devices. As shown in FIG. 10, the mounting surface 4 of the operation space 2 has a display device 3 installed thereon, and the mounting surface 4A has a display device 3A installed thereon. The interactive device 30 is paired with the input device 10, and the interactive device 30A is paired with the input device 10A. As shown in FIG. 10, based on the pairing information and the action information generated by the interactive device 30, the image processing device 40 assigns an output channel to the input device 10, to output the image data from the input device 10 to the display device 3. On the other hand, based on the pairing information and the action information generated by the interactive device 30A, the image processing device 40 assigns an output channel to the input device 10A, to output the image data from the input device 10A to the display device 3A. As shown in FIG. 10, an image P1 is displayed on the display device 3 and an image P2 is displayed on the display device 3A. This way, the different input devices 10, 10A can display their respective image information to the corresponding display devices 3, 3A.

Figure 11:
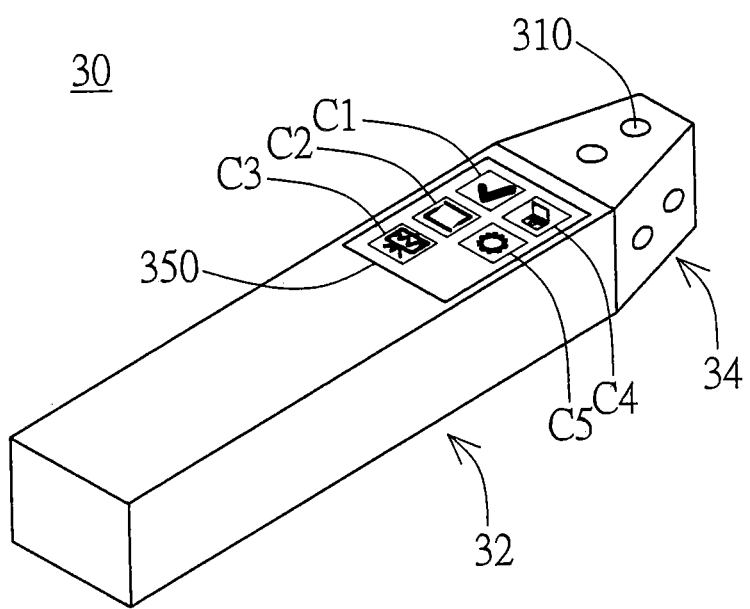
FIG. 11 schematically illustrates an interactive device according to another embodiment of the present invention.

FIG. 11 schematically illustrates an interactive device 30 according to another embodiment of the present invention. As shown in FIG. 11, the interactive device 30 has an operation section 32 and a sensing section 34. The operation section 32 has a user interface 350, which may be, for example, a touch-sensitive display panel. By selecting the specific functions on the user interface 350, the user may perform specific operations. In the example of FIG. 11, the user interface 350 displays multiple icons (C1, C2, C3, C4, and C5), each of which representing a specific function. The image processing device 40 can perform different operations based on the selected icon and the action information. For example, icon C1 may represent a confirm function, icon C2 may represent a switch function, icon C1 may represent a briefing function, icon C4 may represent a central control function, and icon C5 may represent a setting function. For example, the icon C5 may check the power of the interactive device 30, verify the recognition mark of the input device for pairing, etc.

Figure 12A:
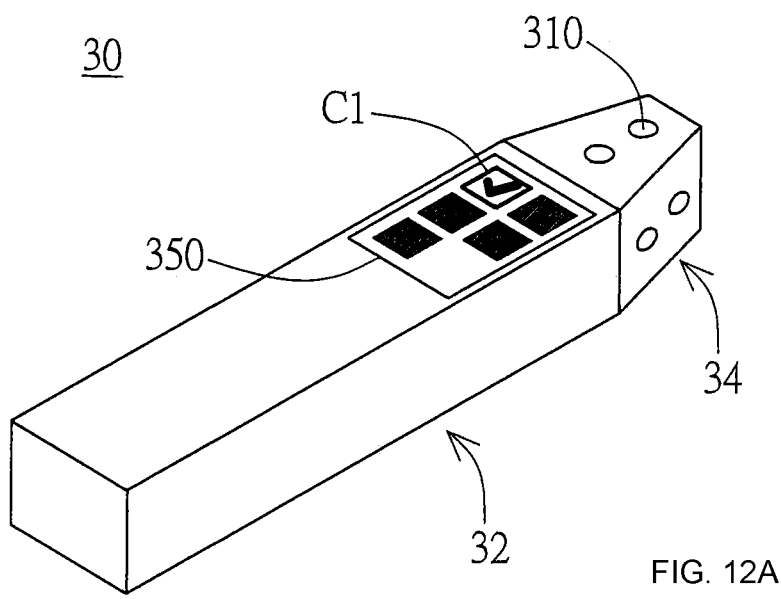
FIGS. 12A and 12B schematically illustrate an operation of the interactive device based on a confirmation signal.
Figure 12B:
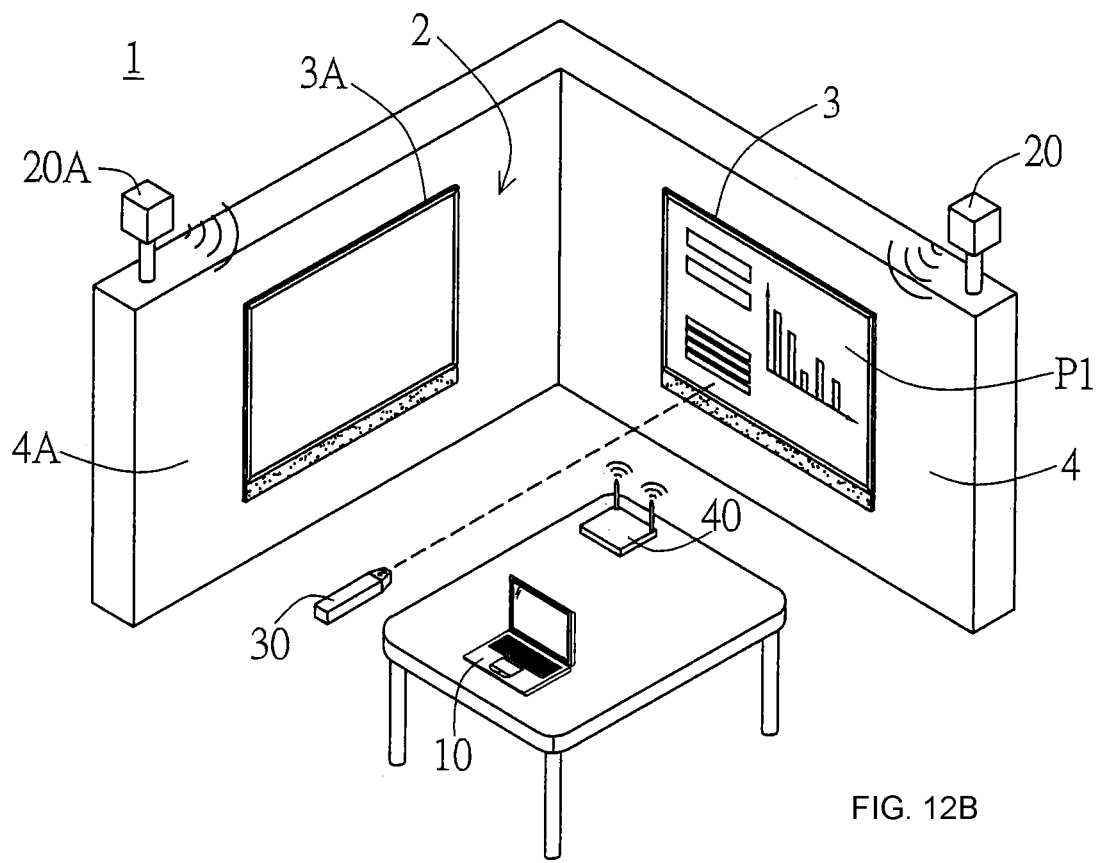

FIGS. 12A and 12B schematically illustrate a confirmation operation of the interactive device in response to a confirmation signal. As shown in FIG. 12A, if the user selects icon C1 on the user interface 350, icon C1 is triggered to generate the confirmation signal to perform the confirmation function. As shown in FIG. 12B, the mounting surface 4 of the operation space 2 has a display device 3 installed thereon, and the mounting surface 4A has a display device 3A installed thereon. The interactive device 30 is paired with the input device 10. As shown in FIG. 12B, when the user points the interactive device 30 to the display device 3 and selects icon C1 on the user interface 350, the interactive device 30 transmits the action information to the image processing device 40 in response to the confirmation data, so that the display device 3 displays image P1. Similarly, when the user points the interactive device 30 to the display device 3A and selects icon C1 of the user interface 350, the interactive device 30 transmits the action information to the image processing device 40 in response to the confirmation data, so that the display device 3A displays the image. This way, the image data can be output to different display devices to produce the displayed image without using a central control computer.

Figure 13A:
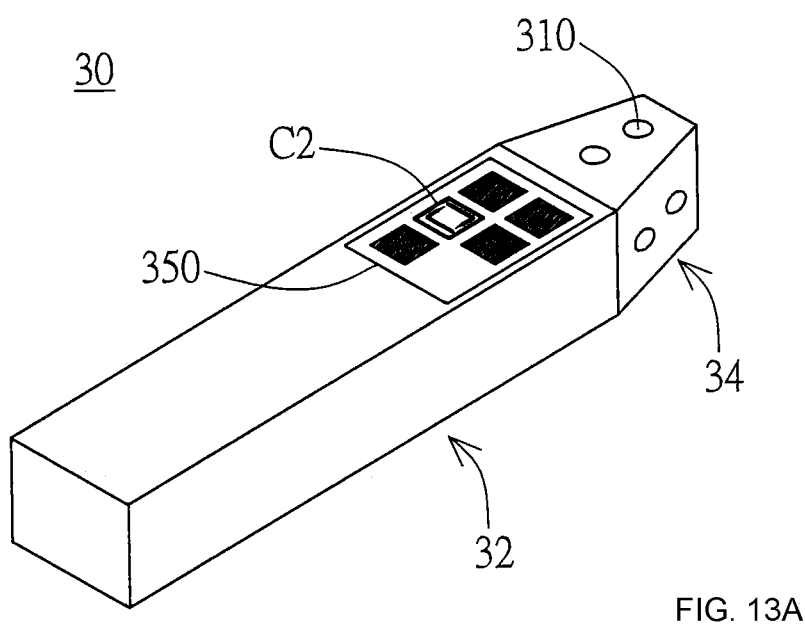
FIGS. 13A, 13B and 13C schematically illustrate an operation of the interactive device based on a switching signal.
Figure 13B:
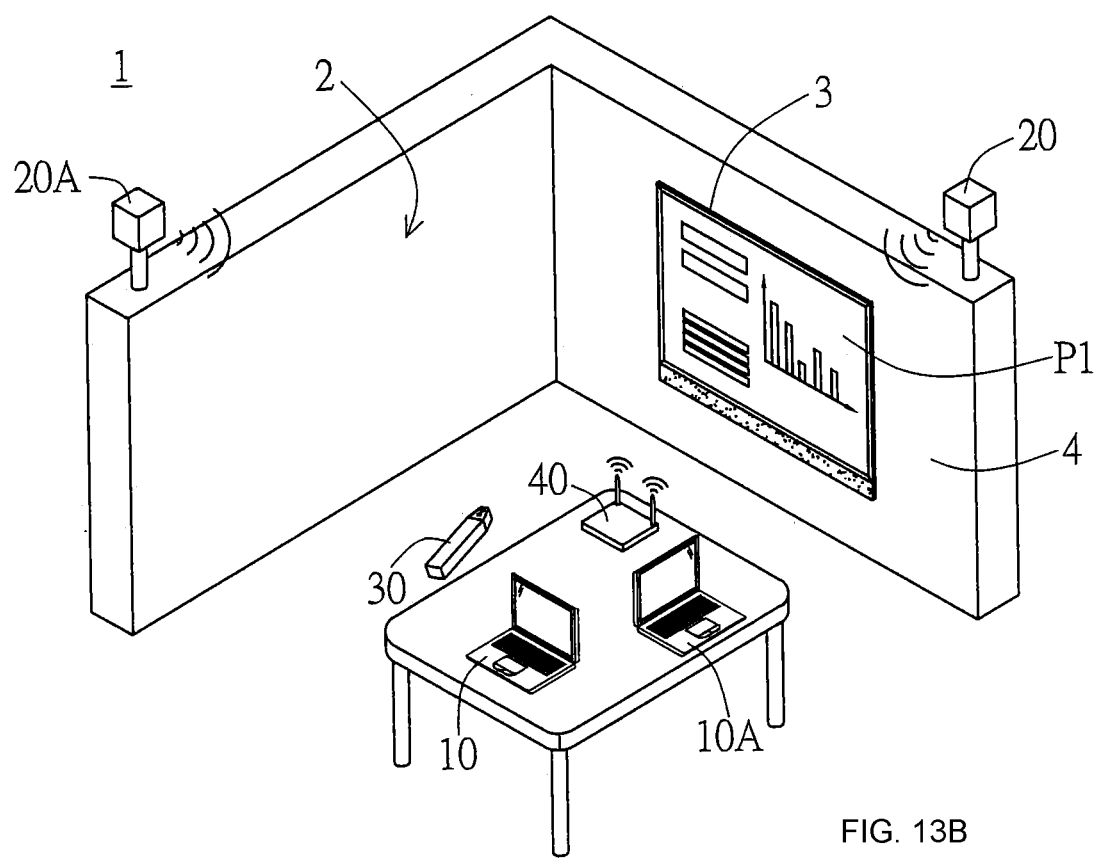
Figure 13C:
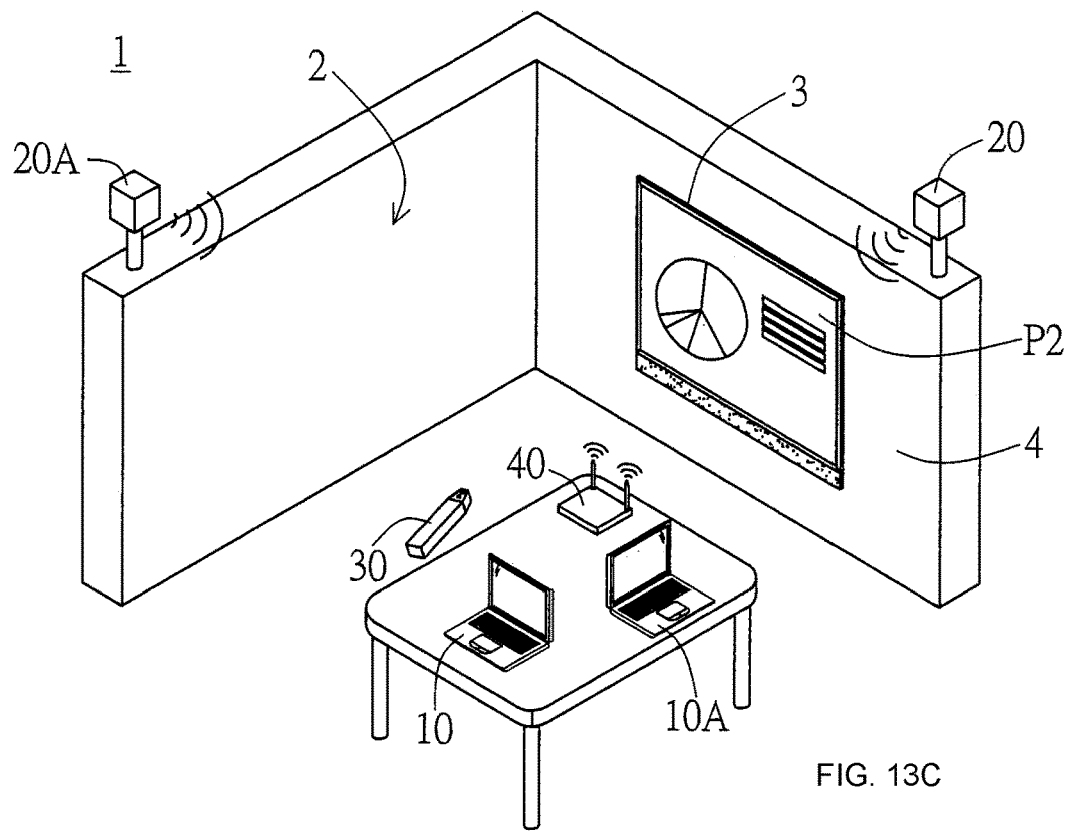

FIGS. 13A, 13B and 13C schematically illustrate a switching operation of the interactive device in response to a switching signal. As shown in FIG. 13A, if the user selects icon C2 of the user interface 350, icon C2 is triggered to generate the switching signal to perform the switching function. As shown in FIG. 13B, the mounting surface 4 of operation space 2 has a display device 3 installed thereon, and the interactive device 30 is paired to both the input device 10 and the input device 10A. The images provided by the input device 10 and input device 10A are different. As shown in FIG. 13B, before the user selects icon C2, the display device 3 displays image P1 from the input device 10. Then, as shown in FIG. 13C, when the user selects icon C2 on the user interface 350, the interactive device 30 outputs the action information to the image processing device 40 in response to the switching signal. Thus, the image displayed on the display device 3 is switched from the initial image P1 provided by the input device 10 to image P2 provided by the input device 10A. This way, the image data generated by different input devices 10 can be output to a desired display device without the need for a central control computer. In this embodiment, the interactive device 30 is paired with multiple input devices 10 and 10A using the method described with reference to FIG. 6; then, icon C2 is used to select one of the input devices so that its image data is output to the display device 3. Thus, the interactive device 30 of embodiments of the present invention can use a one-to-one or one-to-multiple pairing to pair the interactive device 30 with the input device(s) based on the application scenario.

Figure 13D:
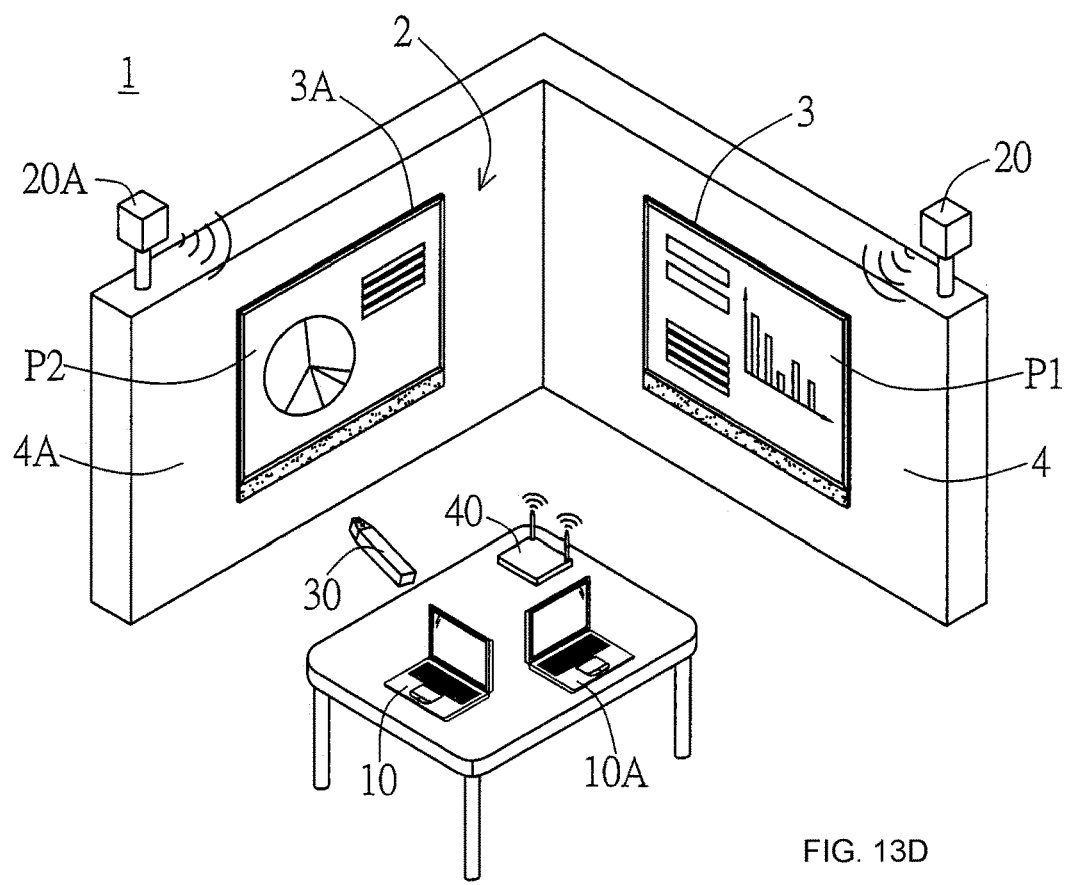
FIG. 13D schematically illustrates another operation of the interactive device based on a switching signal.

FIG. 13D schematically illustrates another switching operation of the interactive device 30 in response to a switching signal. As shown in FIG. 13D, the mounting surface 4 of the operation space 2 has the display device 3 installed on it, and mounting surface 4A has the display device 3A installed on it. The interactive device 30 is paired with the input device 10 and the input device 10A. Before the user selects icon C2 on the user interface 350, the display device 3 displays the image P1 provided by the input device 10. Then, as shown in FIG. 13D, when the user points the interactive device 30 to the display device 3A and selects icon C2 on the user interface 350, the interactive device 30 transmits the action information to the image processing device 40 in response to the switching signal, so that the image P2 is displayed on the display device 3A. This way, the image data from different input devices can be output to different display devices to produce the displayed image without using a central control computer.

Figure 14A:
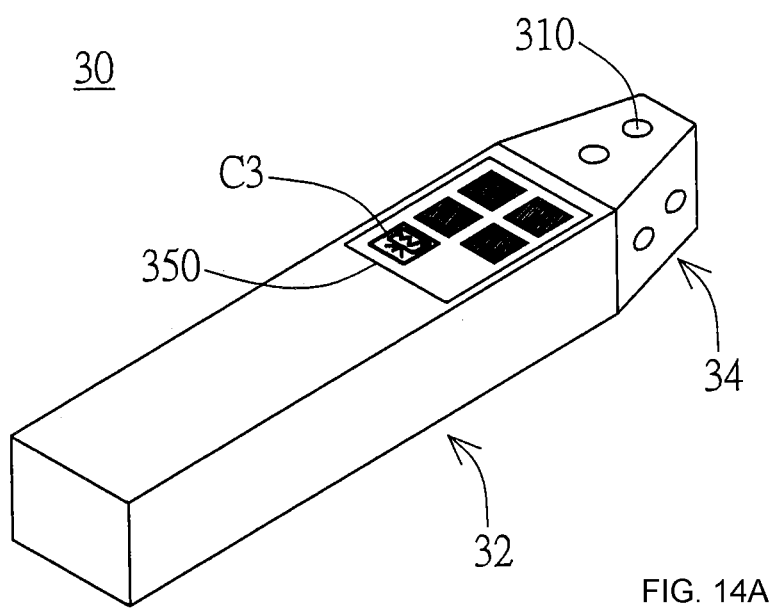
FIGS. 14A and 14B schematically illustrate an operation of the interactive device based on a briefing signal.
Figure 14B:
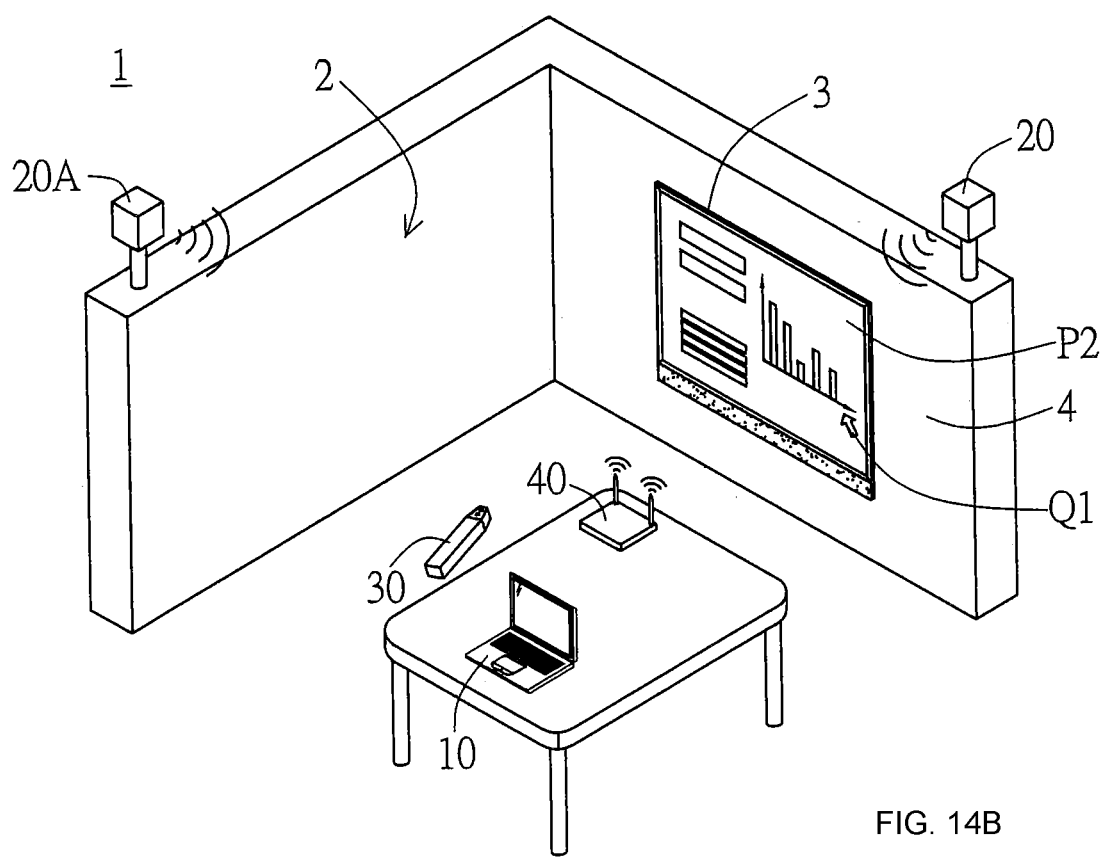

FIGS. 14A and 14B schematically illustrate a briefing operation of the interactive device 30 in response to a briefing signal. As shown in FIG. 14A, if the user selects the icon C3 on the user interface 350, icon C3 is triggered to generate the briefing signal to perform a briefing function. As shown in FIG. 14B, the display device 3 displays the image P1 generated by the input device 10. When the user selects icon C3 on the user interface 350, the image processing device 40 generates a cursor Q1 on the display device 3 based on the briefing signal and the action information. In other words, the image processing device 40 simulates a cursor Q1 base on the action information, and superimposes the image of cursor Q1 on the image P1. Thereafter, the image processing device 40 simulates the movement of the cursor Q1 in directions determined by the posture and movement trajectory of the interactive device 30.

Figure 15:
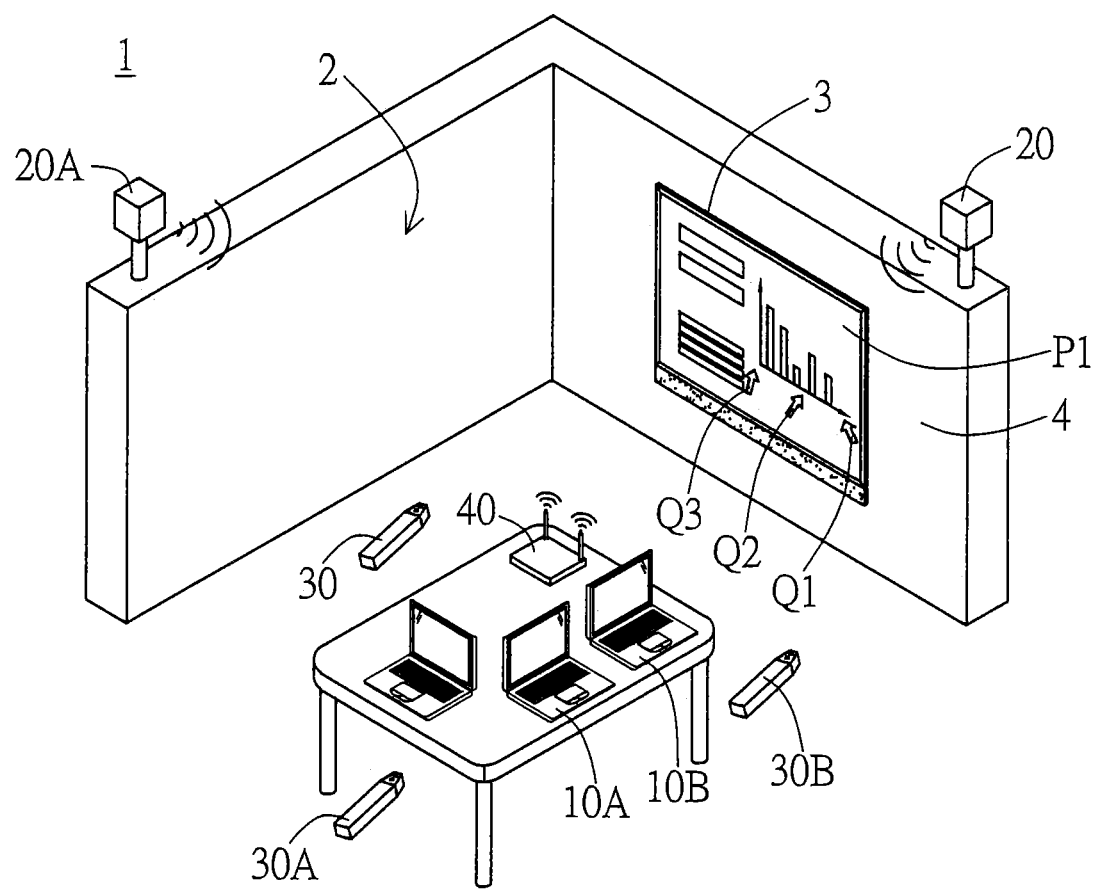
FIG. 15 schematically illustrates another operation of the interactive device based on a briefing signal.

FIG. 15 schematically illustrates another briefing operation of the interactive device 30 in response to a briefing signal. As shown in FIG. 15, the mounting surface 4 of operation space 2 has the display device 3 installed thereon. The interactive device 30 is paired with the input device 10, the interactive device 30A is paired with the input device 10A, and the interactive device 30B is paired with the input device 10B. The display device 3 displays the image P1 generated by the input device 10. When the respective users all select icon C3 of the respective interactive devices 30, 30A and 30B, the image processing device 40 generates, based on the briefing signal and action information of the corresponding interactive devices, cursors Q1, Q2 and Q3 on the display device 3. In other words, the image processing device 40 simulates cursor Q1 based on the action information of the interactive device 30, simulates cursor Q2 based on the action information of the interactive device 30A, and simulates cursor Q3 based on the action information of the interactive device 30B, and then superimposes the images of the cursors Q1, Q2 and Q3 in the image P1. This way, the actions of the different interactive devices can be depicted as different cursors in the same displayed image.

Figure 16A:
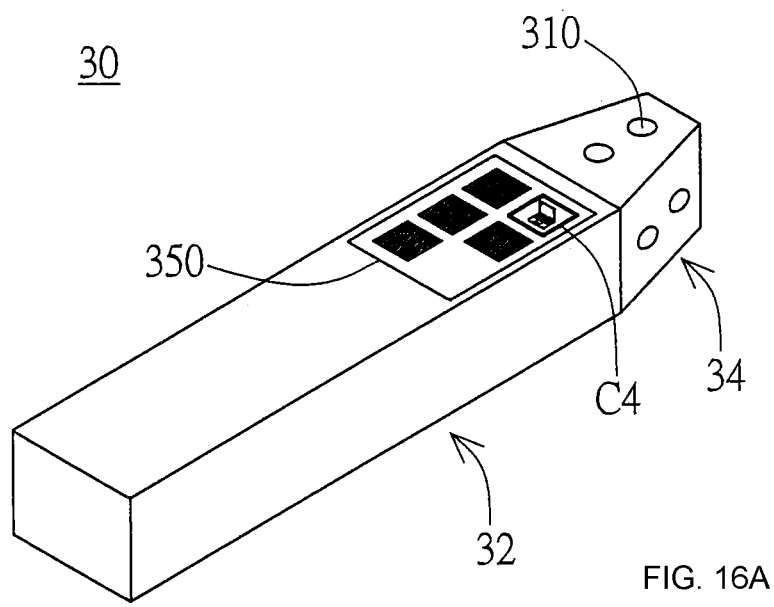
FIGS. 16A and 16B schematically illustrate an operation of the interactive device in response to a central control signal.
Figure 16B:
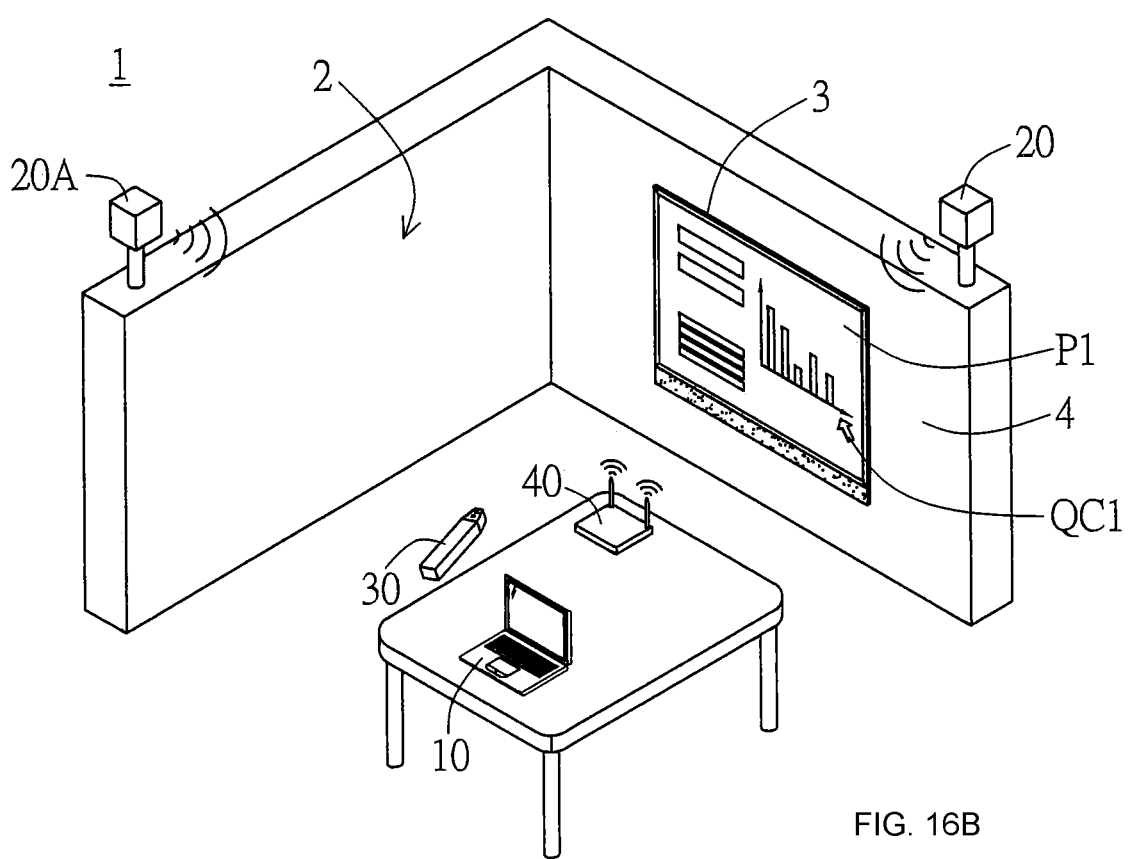

FIGS. 16A and 16B schematically illustrate a central control operation of the interactive device 30 in response to a central control signal. As shown in FIG. 16A, if the user selects the icon C4 on the user interface 350, icon C4 is triggered to generate a central control signal to perform a central control function. As shown in FIG. 16B, the display device 3 displays image P1 provided by the input device 10. When the user selects icon C4 on the user interface 350, the image processing device 40 transmits the action information to the input device 10 in response to the central control signal, so that the display device 3 displays a main cursor QC1 generated by the input device 10. More specifically, the input device 10 generates the main cursor QC1 based on the action information, and superimpose the image of the main cursor QC1 with the image P1. In other words, the input device 10 simulates the movement of the main cursor QC1 in directions determined by the posture and movement trajectory of the interactive device 30.

Figure 17A:
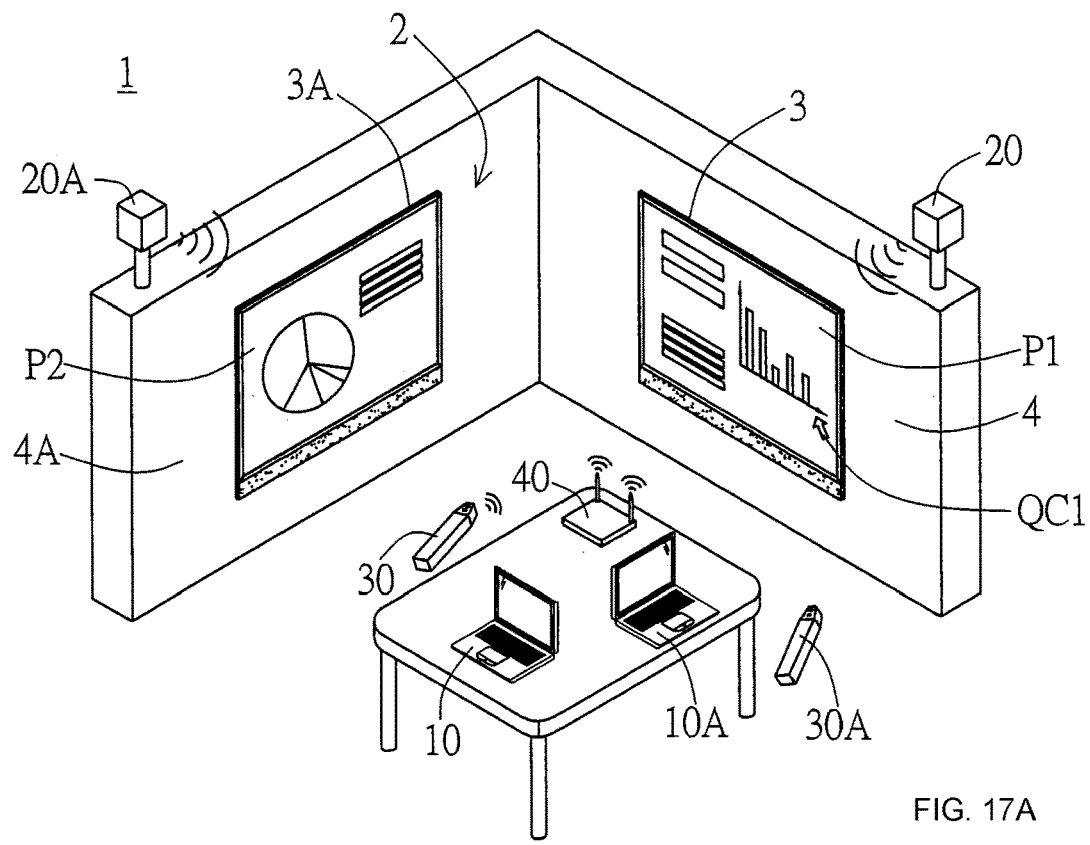
FIGS. 17A and 17B schematically illustrate another operation of the interactive device based on a central control signal.
Figure 17B:
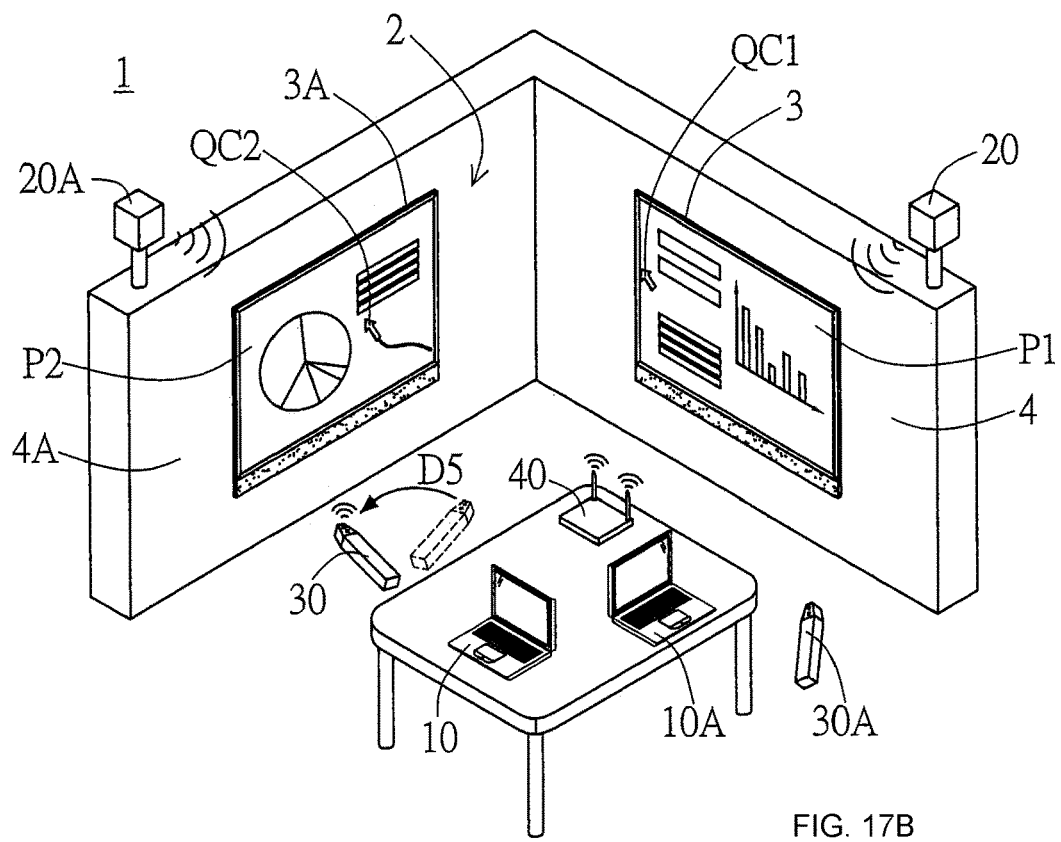

FIGS. 17A and 17B schematically illustrate another central control operation of the interactive device in response to a central control signal. As shown in FIG. 17A, the mounting surface 4 of the operation space 2 has the display device 3 in stalled thereon, and the mounting surface 4A has the display device 3A in stalled thereon. The interactive device 30 is paired with the input device 10, and the interactive device 30A is paired with the input device 10A. The display device 3 displays the image P1 provided by the input device 10, and the display device 3A displays the image P2 provided by the input device 10A. Further, when the user selects icon C4 on the user interface 350 of the interactive device 30, the image processing device 40 transmits the action information from the interactive device 30 to the input device 10 in response to the central control signal, so that the main cursor QC1 generated by the input device 10 is displayed on the display device 3 in the manner described earlier.

Similarly, on the input device 10A, when the user selects icon C4 on the user interface 350 of the interactive device 30A, the image processing device 40 transmits the action information from the interactive device 30A to the input device 10A in response to the central control signal, so that a cursor generated by the input device 10A is displayed on the corresponding display device (e.g., if the interactive device 30A is pointing to the display device 3, then the cursor is displayed on the display device 3). Preferably, when one of the different interactive devices uses the central control function, the central control function of the other interactive devices is disabled, to avoid the confusion in the presentation caused by both interactive devices 30 and 30A having the right to control the main cursor QC1.

In the scenario shown in FIGS. 17A and 17B, the user selects icon C4 of the user interface 350 of the interactive device 30, and swings the interactive device 30 to the left as depicted by the direction D5, to change from an initial posture where it points to display device 3 (as indicated by the dashed lines) to a current posture where it points to display device 3A (as indicated by the solid lines). In response to the central control signal, the image processing device 40 changes the output destination of the action information of the interactive device 30 from the initial input device 10 to the current input device 10A, so that the display device 3A displays a main cursor QC2 generated by the input device 10A. This way, the swinging action of the interactive device 30 can cause the main cursor generated by different input devices to be respectively displayed on the corresponding display devices.

In the descriptions above, the interactive devices are said to be installed on the mounting surfaces. This may refer to physically mounting display panels to the walls or furniture of the conference room. Alternatively, the display devices may be projectors, and the mounting surfaces may be screens or walls of the conference room on which the images are projected. It should be understood that, in the latter situation, when the interactive device is said to be installed on the mounting surface, what is meant is that the image is projected to that mounting surface; and when the interactive device is said to be pointing to the display device, what is meant is that the interactive device is pointing to the image projected by the display device (the projector).

It should also be noted that the various computations performed by the system may be performed by different components of the system, in particular, the interactive devices 30 and the image processing device 40, in a distributed manner. For example, the step of calculating the position and pointing angle of the interactive device 30 based on the positioning signals received by the sensors is preferably performed by the interactive device 30, but can also be performed by the image processing device 40. The step of calculating the projected location of the interactive device 30 (i.e. where on the mounting surfaces the interactive device 30 is pointing to) based on the position and pointing angle of the interactive device 30 may be performed by either the interactive device 30 or the image processing device 40. The step of identifying which display device the interactive device 30 is pointing to based on the position and pointing angle of the interactive device 30 (or based on the projected location) may be performed by either the interactive device 30 or the image processing device 40. One of ordinary skill in the art will be able to implement such distributed computation scheme without undue experimentation. The various information that is required to perform the above calculations, such as the position and scanning parameters of the wireless positioning devices, boundaries of the operation space 2, locations and sizes of the display devices, etc., is provided to the interactive device 30 and/or the image processing device 40 as needed. The information that needs to be transmitted from one device to another also depends on which device performs what calculations. Thus, in a broader sense, the action information that is transmitted by the interactive device 30 to the image processing device 40 may include the posture (position and angle) and movement trajectory (changes in the position and angle) of the interactive device 30, and/or the projected location of the interactive device 30 and changes in the projected location, and/or the identity of the display device pointed to by the interactive device 30 and the change in the identity.

It will be apparent to those skilled in the art that various modification and variations can be made in the video interactive systems and related methods of the present invention without departing from the spirit or scope of the invention. Thus, it is intended that the present invention cover modifications and variations that come within the scope of the appended claims and their equivalents.

What is claimed is:

1. A video interactive system for use in an operation space, wherein the operation space includes at least a first display device, a plurality of wireless positioning devices, and at least a first input device, wherein each wireless positioning device is disposed in the operation space and configured to transmit a scanning positioning signal to scan the operation space with predetermined timing, wherein the first input device is configured to generate first image data, the video interactive system comprising:
   at least one interactive device, paired with the first input device, the interactive device including a plurality of sensors configured to receive the scanning positioning signals, wherein the interactive device is movably disposed in the operation space and configured to generate action information based on the received scanning positioning signals including timing information of the received scanning positioning signals, wherein the action information corresponds to the first display device; and
   an image processing device, electrically connected to the first input device and the first display device, configured to receive the first image data from the first input device and receive the action information from the interactive device, and to output the first image data generated by the first input device paired with the interactive device to the corresponding first display device based on the action information.

2. The video interactive system of claim 1, wherein the interactive device includes an operation section and a sensing section connected to the operation section, and wherein the plurality of sensors are disposed on the sensing section.

3. The video interactive system of claim 2, wherein the interactive device defines a pointing direction, the sensing section has a front facet perpendicular to the pointing direction and a plurality of connecting facets, each connecting facet is joined to the front facet and the operation section, and each of the front facet and the connecting facets has at least one sensor disposed thereon.

4. The video interactive system of claim 3, wherein each of the connecting facets is non-perpendicular to the front facet.

5. The video interactive system of claim 1, wherein the interactive device has a recognition mark, wherein the first input device has a camera and is configured to read the recognition mark on the interactive device to generate pairing information that pairs the first input device with the interactive device, and wherein the image processing device is configured to, based on the pairing information received from the first input device and the action information received from the paired interactive device, assigns an output channel to the first input device to output the first image data generated by the first input device to the first display device that corresponds to the action information.

6. The video interactive system of claim 5, wherein the operation space further includes a second display device disposed therein;
   wherein the interactive device is configured to generate action information corresponding to the first display device or action information corresponding to the second display device depending on a posture of the interactive device;
   wherein the image processing device is configured to, in response to a change of the received action information from the action information corresponding to the first display device to the action information corresponding to the second display device, change the output channel of the first input device from outputting the first image data to the first display device to outputting the first image data to the second display device.

7. The video interactive system of claim 1, wherein the interactive device includes a user interface which is configured to generate a confirmation signal when triggered by a user, and wherein the interactive device is configured to, in response to the confirmation signal, transmit the action information to the image processing device.

8. The video interactive system of claim 1, further comprising a second input device configured to generate second image data, wherein the interactive device has a user interface, wherein the user interface is configured to generate a switching signal when triggered by a user, and wherein the image processing device is configured to, in response to receiving the switching signal from the interactive device, switch from transmitting the first image data to the first display device to transmitting the second image data to the first display device.

9. The video interactive system of claim 1, wherein the interactive device includes a user interface which is configured to generate a briefing signal when triggered by a user, and wherein the image processing device is configured to, in response to receiving the briefing signal and the action information from the interactive device, generate a cursor on the first display device.

10. The video interactive system of claim 1, wherein the interactive device includes a user interface which is configured to generate a central control signal when triggered by a user, and wherein the image processing device is configured to, in response to receiving the central control signal from the interactive device, transmit the action information to the first input device, wherein the first input device is configured to generate a main cursor based on the action information as a part of the image data for display on the first display device.

11. The video interactive system of claim 1, wherein the interactive device is configured to calculate the action information based on timing of receipt of the scanning positioning signals by the plurality of sensors, and wherein the action information includes a position and an angle of the interactive device.

12. The video interactive system of claim 1, wherein in a setting operation, the image processing device is configured to output mark information to the first display device, the interactive device is configured to output initial action information corresponding to the first display device while the mark information is being output to the first display device, and the image processing device is configured to store the initial action information;
   wherein the image processing device is configured to, after the setting operation, receive another action information from the interactive device, and to output the first image data to the first display device based on a comparison of the other action information with the stored initial action information.

* * * * *